United States Patent [19]

Holmqvist et al.

[11] 4,136,721
[45] Jan. 30, 1979

[54] METHOD AND APPARATUS FOR TRANSFERRING LIQUID FROM A STORAGE CONTAINER TO A VESSEL IN A CONTROLLED MANNER

[75] Inventors: Göran Holmqvist, Älvsjö; Bo Molander, Lidingö; Jan Wicklund, Spånga, all of Sweden

[73] Assignee: AGA Aktiebolag, Lidingö, Sweden

[21] Appl. No.: 798,494

[22] Filed: May 19, 1977

[30] Foreign Application Priority Data

Jun. 1, 1976 [SE] Sweden ............................ 7606120

[51] Int. Cl.² ............................................. B65B 3/10
[52] U.S. Cl. ........................................ 141/11; 62/53; 141/82; 141/95; 141/198; 222/146 H
[58] Field of Search .............. 62/52, 53, 55; 137/558; 141/1, 11, 82, 94, 95, 192, 198, 392; 222/146 H, 146 HE, 394

[56] References Cited

U.S. PATENT DOCUMENTS

| | | | |
|---|---|---|---|
| 3,170,479 | 2/1965 | Mueller | 137/558 X |
| 3,440,829 | 4/1969 | Davies-White | 62/53 X |
| 3,803,858 | 4/1974 | Simon | 222/394 X |
| 3,920,056 | 11/1975 | Piecuch | 141/94 |

*Primary Examiner*—Richard E. Aegerter
*Assistant Examiner*—Frederick R. Schmidt
*Attorney, Agent, or Firm*—Larson, Taylor and Hinds

[57] ABSTRACT

A method and apparatus for transferring liquid from a first vessel to a second vessel. The second vessel communicates with the first vessel at a location beneath the surface of the liquid contained therein and means are provided for passing vapor present above the surface of said liquid to a heating zone where the vapor is heated to a temperature above the boiling point of the liquid. The heated vapor is then contacted with the surface of said liquid by means provided therefor. As a result of said contact, the surface liquid is caused to boil, thereby increasing the pressure above said surface, this increased pressure causing movement of liquid from the first vessel to the second vessel.

12 Claims, 3 Drawing Figures

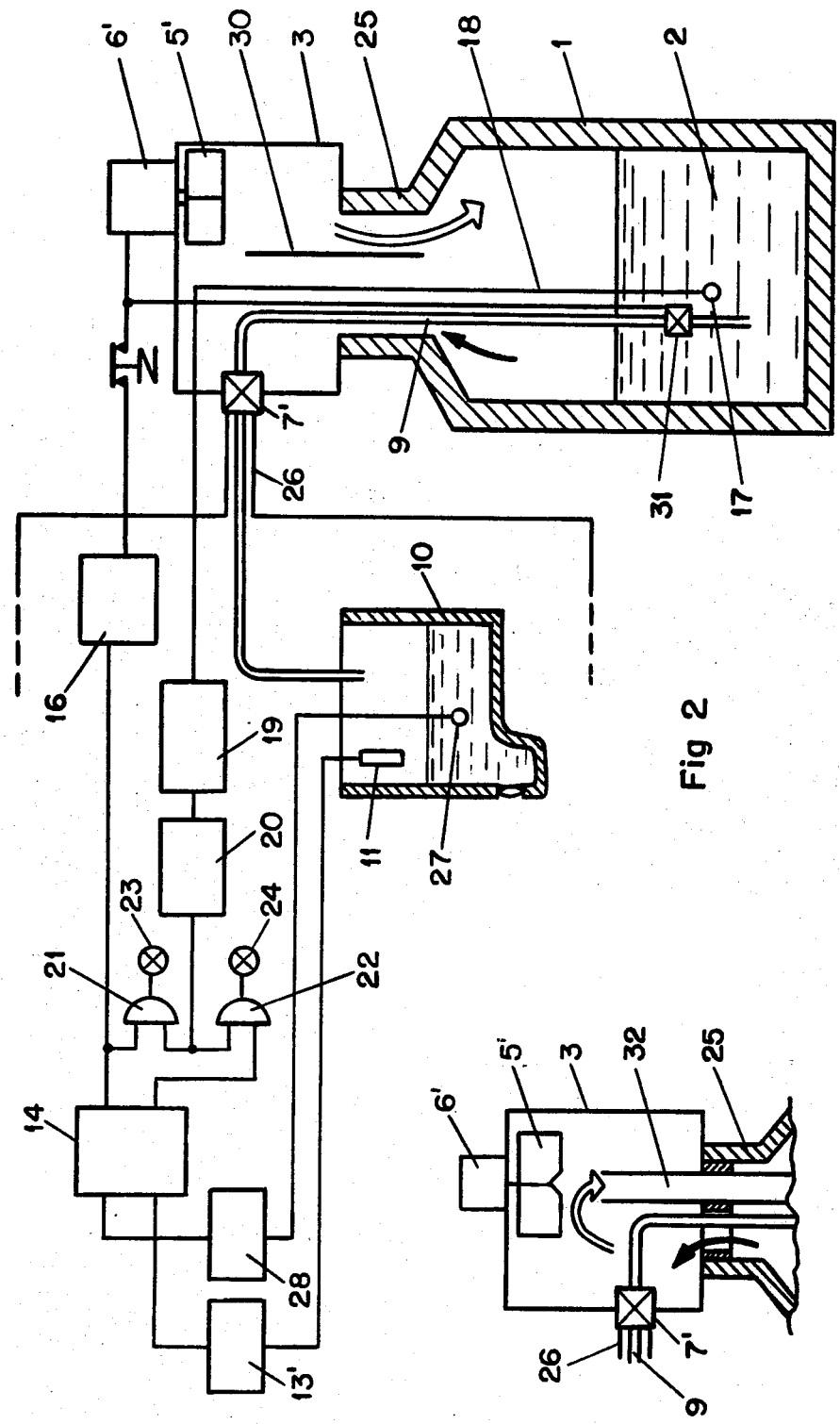

METHOD AND APPARATUS FOR TRANSFERRING LIQUID FROM A STORAGE CONTAINER TO A VESSEL IN A CONTROLLED MANNER

The present invention relates to a method and an apparatus for transferring liquid from one vessel to another vessel, and more particularly, although not exclusively, for transferring low-temperature liquids, e.g. liquids cooled to cryogenic temperatures from a storage container to a reservoir vessel.

Certain parts of some apparatus, such as thermo-cameras, and electron microscopes, must be cooled cryogenically in order for the apparatus to operate satisfactorily. Such cooling is often effected with liquid nitrogen, which must be poured at regular intervals into a reservoir vessel arranged in the apparatus, said vessel co-operating with those parts of the apparatus to be cooled. Because of the limited space available, the size of the vessel is restricted, and hence, when the apparatus is used in environments at normal ambient temperatures, e.g. room temperature, the content of the vessel is often completely evaporated after only a relatively short period of time, for example in about 2.5 hours. When the apparatus is to be used for a long period of time, particularly when the apparatus is to remain stationary for a long period of time, it may be necessary to replenish said vessel whilst the apparatus is operating; naturally it is an advantage if this can be effected automatically from a storage container.

Previously, liquid nitrogen has been transferred from the storage container by bringing the liquid, during a filling operation, into contact with a heated coil immersed in the liquid, whereupon the liquid in contact with said coil begins to boil, thereby to generate a gas which causes the pressure above the surface of the liquid to increase. This increased pressure on the surface of the liquid caused by the gas presses the liquid up through a pipe opening into said liquid, the liquid being then passed to said vessel. This method, however, cannot be applied with sufficient precision. A relatively long period of time lapses before the liquid begins to boil, and the formation of bubbles in the liquid deleteriously effects the transfer thereof. Neither is it possible to stop the boiling of the liquid immediately. Moreover, the method requires considerably energy.

An object of the invention is to provide a method and an apparatus whereby a liquid can be transferred from one vessel to another vessel more readily and with more precision than was hitherto possible.

According to one aspect, this invention consists in a method of transferring a liquid from a first vessel to a second vessel communicating with said first vessel at a level beneath the surface of the liquid contained therein, comprising the steps of passing vapour from the surface of the liquid in said first vessel to a heating zone; heating said vapour in said zone to a temperature above the boiling point of the liquid in said first vessel; bringing the heated vapour into contact with the surface of said liquid so as to vaporize said surface liquid thereby to increase the pressure above said surface; and utilising said increased pressure to force liquid from said first vessel to said second vessel.

According to another aspect, this invention consists in an apparatus for transferring a liquid from a first vessel to a second vessel, said apparatus comprising liquid-conveying means extending from said second vessel to said first vessel to a level beneath the liquid contained in said first vessel; a chamber having means whereby it can be placed in communication with said first vessel; heating means co-operating with said chamber; means for passing vapour from the surface of the liquid in said first vessel into contact with said heating means to heat said vapour to a temperature above the boiling point of said liquid; and means for contacting the heated vapour with the surface of the liquid to vaporize said surface liquid, thereby to raise the pressure in said vessel above said surface.

The invention is based on the principle of boiling solely the upper layer of the liquid. In this way, there is created in a short time a sufficiently high over-pressure in the storage container to force the liquid, e.g. liquid nitrogen ($LN_2$) up through a pipe opening into said liquid and transferring said liquid to the aforesaid vessel. No bubbles are formed in the liquid when applying this principle. The surface of the liquid is heated by causing gas, such as nitrogen gas in the upper part of the storage container to pass a heating means having or capable of generating a substantially higher temperature than the boiling point of the liquid in the container. For example, when the liquid is nitrogen, this heating means may be a wall of a chamber in direct thermal-conducting contact with the ambient air and communicating with said storage container. Since the boiling point of nitrogen is approximately $-196°$ C., a temperature difference between the gas adjacent the surface of the liquid nitrogen and said surface sufficient to boil the nitrogen effectively at said surface can be obtained at relatively low ambient temperature, e.g. an ambient temperature of $-15°$ C. As the gas circulates, the nitrogen already present in gas phase will expand as a result of being heated, whereby the pressure exerted by the gas on the surface of the liquid will also increase. The storage container and the chamber must, of course, be hermetically sealed in order to obtain the requisite pressure. Subsequent to the nitrogen gas passing the heating means, the heated gas is forced down onto the surface of the liquid, for example by means of a fan, whereupon the liquid located at said surface is heated to a temperature above the boiling point of the liquid.

The invention will now be described in more detail with reference to the drawings; in which:

FIG. 2 is an explanatory diagram which illustrates a further embodiment of the invention; and FIG. 3 shows schematically part of a storage container used in an embodiment of the invention.

In the Figures, identical elements have identical reference numerals.

Figure 1:
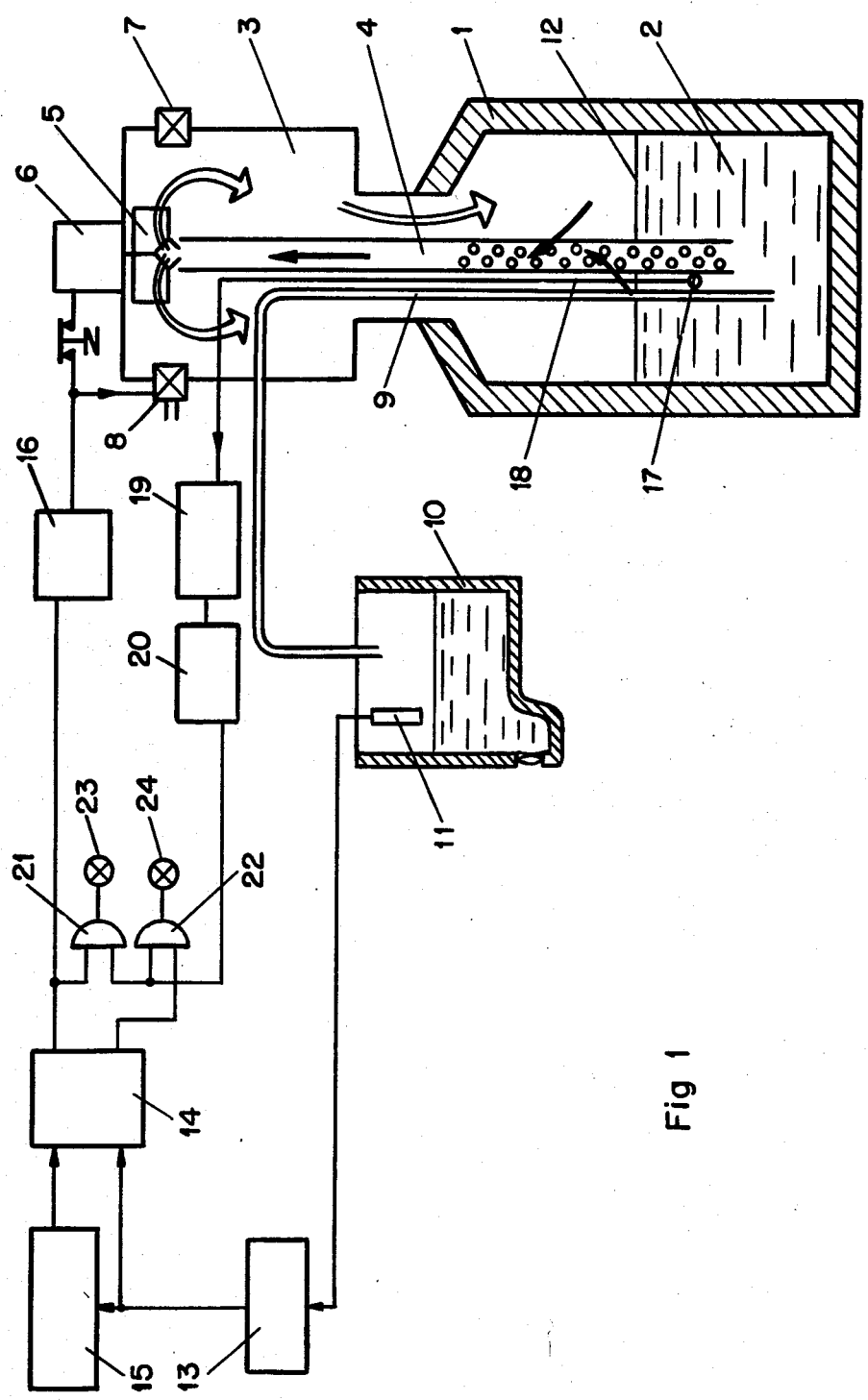
FIG. 1 is an explanatory diagram which illustrates one embodiment of the invention.

In FIG. 1, the reference numeral 1 identifies a thermally-insulated wall of a hermetically sealed storage-container. The container is shown to be half full of liquid nitrogen ($LN_2$) 2. Arranged at the top of the container is a hollow member having walls which are not thermally insulated and which define a chamber for receiving vapour from the liquid. Conveniently, the member 3 can be attached to a storage container containing a standard-type liquid nitrogen by means of a screw connection. Extending into the hollow member 3 and into the storage container is a pipe 4 which is perforated along that part thereof located in the storage container. Adjacent the end of the pipe located in the storage container is a fan 5 which is driven by a motor 6. Cold gas, identified by solid, narrow arrows, is drawn by the fan 5 through the perforations into the pipe, and up through the pipe into contact with the walls of the hollow member 3, as shown by the broad, open arrows. Since the walls of the hollow member 3 are not thermally insulated, they will be at a higher temperature than the gas rising from the insulated storage container and the gas will be heated as a result of its contact with said walls. The thus heated gas is then caused to flow down onto the surface 12 of the liquid, whereupon an exchange of heat takes place between the liquid present at said surface and said gas, causing said liquid to boil. Arranged in the wall of the hollow member 3 are two valves, of which one, 7, is a safety valve which is arranged to open when the pressure in the hollow member 3 exceeds a predetermined level, and the other, 8, is a regulatable valve which is arranged to close when liquid is passed from the storage container to a reservoir vessel in a manner hereinafter described, and to open when the reservoir vessel has been filled to a predetermined level. Extending from the reservoir vessel 10 into the storage container, via the hollow member 3, is a conveyor pipe 9 through which liquid nitrogen is conveyed to the vessel 10.

Arranged in the vessel 10 is a level indicator 11 which is arranged to produce an electrical signal when the surface liquid in the vessel reaches a predetermined, upper level.

The illustrated apparatus has the following mode of operation. The valve 8 is normally open so as to permit varporized nitrogen to pass therethrough. When the vessel 10 is to be replenished, the valve 8 is closed and the motor 6 is started so as to drive the fan 5. Cold gas is then drawn up through the pipe 4 and blown over the walls of the hollow member 3 so as to heat the gas. The heated gas is then caused to pass along the outside of the pipe 4 down onto the surface 12 of the liquid in the storage container, the surface liquid being vaporized as a result of an exchange of heat between the heated gas and said liquid, thereby rapidly increasing the pressure on the liquid. As a result of this increased pressure, liquid nitrogen will be forced through the pipe 9 into the vessel 10, the heat required to vaporize the surface liquid being extracted from the ambient air.

The motor 6 will continue to drive the fan 5 until the liquid reaches a predetermined level in the vessel 10. This level is monitored by the level indicator 11 which when said level is reached, applies a signal to a Schmitt-trigger stage 13 which outputs a binary "1" signal state. This signal state is applied to a resetting input of a bistable flip-flop 14 and to a timing circuit 15. The Q-output of the bistable flip-flop is then set to zero, whereupon the drive circuit 16 of the drive motor 6 is de-energised so that the fan 5 stops. The valve 8 is opened as a result of setting the Q-output of the flip-flop to zero. When the valve 8 is open, the pressure in the storage container will fall and the transfer of liquid will cease immediately. The timing circuit 15 energised by the output signal of the Schmitt-trigger state is arranged to produce a binary "1"-signal after a predetermined length of time has elapsed subsequent to its being activated by the Schmitt-trigger stage 13, this length of time, when transferring liquid nitrogen to a reservoir vessel in an IR-camera, being, for example, 1.5 hours. This signal is applied to the setting input of the bistable flip-flop 14, whereupon the flip-flop is set to "1", so that its Q-output has a binary "1"-signal state. As a result hereof the drive circuit 16 causes the fan 5 to operate and the valve 8 to close, thereby to restart the transfer of liquid from the storage container to the vessel 10.

Naturally, the storage container will ultimately be emptied of liquid and must either be refilled or exchanged for a full container. In order to enable the container to be refilled or replaced whilst sufficient liquid remains in the container to replenish the vessel 10, a liquid-level indicator 17 is arranged at a predetermined level above the bottom of the storage container 1. When the liquid in the container falls to said predetermined level, a signal is fed from the level indicator 17 to a further Schmitt-trigger stage 19 via a line 18, said further Schmitt-trigger stage 19 emitting a binary "1"-signal when the surface of the liquid in the container falls beneath the level monitored by the indicator 17. The output signal of the Schmitt-trigger stage 19 is applied to a pulse oscillator 20 which will emit a signal provided that the Schmitt-trigger stage 19 has a "1"-output signal. The output signal from the oscillator 20 is applied to a respective input of two AND-gates 21 and 22. The output signal Q from the bistable flip-flop 14 is applied to the other input of the AND-gate 21 while the output signal Q of said flip-flop 14 is applied to the other input of the AND-gate 22. Connected on the output side of the AND-gate 21 is a lamp 23, while a further lamp 24 is connected on the output side of the AND-gate 24.

Should the liquid in the storage container fall to a level beneath that monitored by the level indicator 17 whilst the vessel 10 is being filled, i.e. the $\bar{Q}$-signal from the bistable flip-flop 14 is a binary "1" and the pulse oscillator 20 is activated by the Schmitt-trigger stage 19, the AND-gate 21 will allow the pulses from the pulse oscillator 20 to pass to the lamp 23, whereupon the lamp begins to flash. On the other hand, should the liquid in the storage container fall to said level when the vessel 10 is not being replenished, i.e. when the Q-signal of the bistable flip-flop 14 is a binary "1", the lamp 24 will begin to flash instead. The level indicator 17 is suitably arranged to monitor a level in the storage container 1 at which sufficient liquid can be transferred to replenish the vessel 10 without the mouth of the tube 9 being exposed above the surface of the liquid.

Thus, should the storage container begin to be exhausted of liquid whilst the vessel 10 is being replenished, the operator will be informed of the fact by the flashing lamp 23. The operator, however, will not refill or replace the storage container immediately, but will wait until the lamp 23 is extinguished and the lamp 24 begins to flash instead, which takes place when the Schmitt-trigger stage has been activated through the level indicator 17 and the flip-flop 14 reset. The lamps 23 and 24 conveniently have different colours. Other indication than a visual indication is conceivable, of course.

FIG. 2 shows a further embodiment of the apparatus according to the invention when used with an IR-camera. In the container 1 there is provided a fan 5' positioned asymmetrically in the hollow member 3 on the storage container. In this embodiment, the pipe 4 of the FIG. 1 embodiment is replaced by a partition or baffle plate 30 arranged in the hollow member 3 to extend downwardly into a neck portion 25 of the storage container, said hollow member 3 seating against the neck portion 25. In this embodiment vapour heated on the walls of the hollow member 3 is caused to flow down on one side of the partition 30 into contact with the surface of the liquid in the container, and vapour produced by said contact to flow up the other side of the partition. In the FIG. 2 embodiment the valve 8 is omitted and the safety valve 7' is positioned on the left side of the hollow member 3 as shown in the Figure, the pipe 9 extending through the valve 7'. When the vessel 10 has been replenished, the gas in the chamber formed by the hollow member 3 can be used to protect sensitive parts of the instrument being served by the apparatus according from the invention. To this end there extends from the valve 7 externally of the member 3 a duct 26 which leads to those parts of the instrument to be protected. The valve 7' is arranged to be opened subsequent to filling the vessel 10 to the level desired so that the vapour flows around the pipe 9, and into the duct 26, this arrangement being particularly suitable when the camera is to be used in a relatively strongly corrosive atmosphere. In the FIG. 2 embodiment, the valve 8 is replaced by a valve 31 arranged in the pipe 9. This valve 31 is normally closed, and is only open when the vessel 10 is being replenished. If the valve 31 is completely gas-tight, an over-pressure can be obtained above the surface of the liquid in the storage vessel, which means that filling of the vessel 10 can be commenced more rapidly subsequent to activating the drive circuit 16.

In this embodiment, the vessel 10 is also provided with two level indicators 11 and 27, of which one 11, is activated when the surface of the liquid has reached a predetermined level, and the other, 27, is activated when the surface of the liquid has fallen beneath a further predetermined level. The first level indicator 11 is connected to a level sensor 13', the output of which, when the level indicator 11 is activated, supplies a binary "1"-output signal to the resetting input of the bistable flip-flop 14. The output signal from the level sensor 13' may have the form of a short-duration pulse occurring just when the level of liquid in the vessel 10 has reached the level at which the level indicator is activated. The other level indicator 27 is connected to a further level sensor 28, the output of which is connected to the setting input F of the flip-flop 14. The level sensor 28 constantly emits a binary "1"-signal when the level of liquid in the vessel 10 is beneath the level at which the level indicator 27 is activated. When the level of liquid lies beneath the level given for the level indicator 27, the flip-flop 14 is thus set by a binary "1"-signal from the level sensor 28 and remains in this set position even when the level sensor 28 emits a binary "0"-signal subsequent to the level of liquid, during a filling operation, reaching above the lower level indicator 27, until its level sensor 13' emits a binary "1"-signal, indicating that the vessel has been filled to the desired level. Other functions of the FIG. 2 embodiment are the same as the functions of the embodiment described with reference to FIG. 1. The valve 31 is opened when the drive circuit 16 is activated and is closed when said circuit is de-activated by the same signal as that supplied to the drive motor 6', as opposed to the valve 8 in FIG. 1, which is closed when the drive circuit 16 is activated and is opened when said drive circuit 16 is de-activated.

FIG. 3 shows a further embodiment of the hollow member 3 co-operating with the container. As with the embodiment shown in FIG. 2, the fan 5' is placed asymmetrically in the hollow member 3 and a pipe 32 is arranged asymmetrically in the neck of the container 1, with one end of the pipe facing the fan 5' and the other end of the pipe terminating beneath the neck 25. When operating, the fan 5' blows gas heated against the walls of the member 3 through the pipe 32 down into the container 1. Because the pipe 32 is positioned asymmetrically in the neck 25, the gas will circulate in the lower portion of the container 1. The pipe 32 is conveniently made of a thermal conducting material and extends down into the lower portion of the container to a level immediately above the highest permitted level. If the storage container should be filled to an excessively high level, the upper layer of the liquid will be boiled off as a result of the heat conducted along the pipe 32. The vaporized nitrogen will flow out through the safety valve 7'. In other respects, the embodiment shown in FIG. 3 coincides with the embodiment shown in FIG. 2.

Many modifications are possible within the scope of the invention. In order to obtain the largest possible heat-transmitting surface, the walls of the hollow member 3 may be corrugated or be provided with internal and/or external surface-enlarging flanges. The fan 5 may have a variable speed, in order to provide a uniform flow through the pipe 9 and to avoid excessively high pressures in the upper portion of the container 1, the speed of the fan motor 6 being regulated, for example, by means of a pressure monitor, e.g. a manometer arranged in the hollow member 3, or a flow meter arranged in the pipe 9. When liquid other than liquids at cryogenic temperatures shall be transferred by means of the method according to the invention, the hollow member 3 will be provided with heating elements capable of heating the vapour to a temperature above the boiling point of the liquid in question.

Further, the hollow member may be separate from the storage container, in which case the hollow member will have means for sealingly attaching the same to the neck of said container, or the said member may form an integral part of said container, in which case means will be provided for refilling the container, said means being such as to ensure hermetic sealing of the container.

We claim:

1. A method of transferring a liquid from a first vessel to a second vessel communicating with said first vessel at a level beneath the surface of the liquid contained therein, comprising the steps of passing cold vapour from the surface of the liquid in said first vessel, through a passage whose cross-sectional area is smaller than the cross-sectional area of said liquid surface, to a heating zone; heating said vapour in said zone to a temperature above the boiling point of the liquid in said first vessel; forcibly passing the thus heated vapor by a positively driven circulating device back to said first vessel separately from the flow of cold vapor such that vapor is circulated in a closed path between said first vessel and said heating zone, and circulating thus heated vapour above the surface of said liquid to increase the pressure above said surface; and utilizing said increased pressure to force liquid from said first vessel to said second vessel.

2. A method as claimed in claim 1 comprising venting the heating zone subsequent to transferring liquid from the first vessel to the second vessel.

3. A method as claimed in claim 2, comprising using gas evacuated from the heating zone during said venting to create a protective atmosphere.

4. A method as claimed in claim 1, comprising sensing the level of liquid in said second vessel; effecting a liquid transfer when the sensed level is beneath a first limit; and interrupting the liquid-transfer operation after the sensed level reaches a second limit level.

5. A method as claimed in claim 4, comprising interrupting said liquid-transfer after the lapse of a predetermined period of time from the time at which said second limit level was sensed.

6. A method as claimed in claim 1, comprising sensing the level of liquid in the first vessel and producing a warning signal when the level sensed is a predetermined level.

7. An apparatus for transferring a liquid from a first vessel to a second vessel, said apparatus comprising first and second vessels, liquid-conveying means extending from said second vessel to said first vessel to a level beneath the liquid contained in said first vessel; a chamber in communication with said first vessel above the liquid level therein via a passage arranged between said chamber and said first vessel, the cross-sectional area of which passage is smaller than the cross-sectional area of the liquid surface; heating means cooperating with said chamber; means for passing cold vapour from above the surface of the liquid in said first vessel to said chamber and into contact with said heating means to heat said vapour to a temperature above the boiling point of said liquid and means for circulating said heated vapour back to said first vessel above the surface of the liquid, thereby to raise the pressure in said first vessel above said surface, said means for circulating vapour comprising a fan arranged in said chamber, and means for separating the flows of warm and cold vapour through said passage.

8. An apparatus according to claim 7, wherein the first vessel is provided above the surface of the liquid therein with a vent valve arranged to be closed during a liquid-transfer operation and to be open otherwise, and control means for effecting closure of said valve during liquid transfer.

9. An apparatus as claimed in claim 7, wherein the liquid-conveying means has arranged therein a valve which is arranged to open when a liquid-transfer operation is to be effected.

10. An apparatus as claimed in claim 7 having a liquid-level sensing device in said second vessel and means cooperating with said sensing device for initiating a liquid-transfer operation when a first limit level is sensed by said sensing device and for interrupting said liquid-transfer operation when a second limit level is sensed by said device.

11. An apparatus as claimed in claim 7, having a level sensing device arranged in said first vessel, and warning means co-operating with said level sensing device to issue a warning when the surface of the liquid in said first vessel is at a predetermined level.

12. An apparatus according to claim 11, characterized in that the warning means in co-operation with the liquid level sensing device being arranged to produce one type of signal when the second vessel is being filled and another type of signal when the second vessel is not being filled, whereby one type of alarm signal is produced when the liquid level in the first vessel falls beneath the predetermined level when the second vessel is being filled and another type of alarm signal when the second vessel is not being filled or subsequent to the second vessel being completely filled.

* * * * *